US011042990B2

(12) United States Patent
Pao et al.

(10) Patent No.: US 11,042,990 B2
(45) Date of Patent: Jun. 22, 2021

(54) AUTOMATIC OBJECT REPLACEMENT IN AN IMAGE

(71) Applicant: Adobe Inc., San Jose, CA (US)

(72) Inventors: I-Ming Pao, Palo Alto, CA (US); Sarah Aye Kong, Cupertino, CA (US); Alan Lee Erickson, Highlands Ranch, CO (US); Kalyan Sunkavalli, San Jose, CA (US); Hyunghwan Byun, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 183 days.

(21) Appl. No.: 16/176,917

(22) Filed: Oct. 31, 2018

(65) Prior Publication Data

US 2020/0134834 A1 Apr. 30, 2020

(51) Int. Cl.
*G06K 9/00* (2006.01)
*G06T 7/194* (2017.01)
*G06N 3/08* (2006.01)
*G06T 11/40* (2006.01)
*G06T 7/11* (2017.01)

(52) U.S. Cl.
CPC .............. *G06T 7/194* (2017.01); *G06N 3/08* (2013.01); *G06T 7/11* (2017.01); *G06T 11/40* (2013.01)

(58) Field of Classification Search
CPC .......... G06T 7/194; G06T 7/11; G06T 11/40; G06N 3/08
USPC ........................................................ 382/164
See application file for complete search history.

(56) References Cited

U.S. PATENT DOCUMENTS

| | | | |
|---|---|---|---|
| 6,266,068 B1 * | 7/2001 | Kang ..................... | G06T 11/60 345/422 |
| 9,053,578 B2 * | 6/2015 | Beckman ............... | G06T 11/00 |
| 9,857,953 B2 | 1/2018 | Sunkavalli et al. | |
| 9,858,675 B2 | 1/2018 | Shen et al. | |
| 10,074,161 B2 | 9/2018 | Shen et al. | |
| 10,163,195 B2 * | 12/2018 | Berlin ..................... | G06T 5/001 |
| 10,867,416 B2 * | 12/2020 | Shen ...................... | G06T 11/00 |
| 2017/0236287 A1 * | 8/2017 | Shen ..................... | G06N 3/0454 382/206 |
| 2017/0294000 A1 * | 10/2017 | Shen ..................... | G06F 3/0482 |

OTHER PUBLICATIONS

Tsai, Yi-Hsuan, et al. "Sky is not the limit: semantic-aware sky replacement." ACM Trans. Graph. 35.4 (2016): 149-1. (Year: 2016).*

* cited by examiner

*Primary Examiner* — Jonathan S Lee
(74) *Attorney, Agent, or Firm* — F. Chau & Associates, LLC

(57) ABSTRACT

Systems and techniques for automatic object replacement in an image include receiving an original image and a preferred image. The original image is automatically segmented into an original image foreground region and an original image object region. The preferred image is automatically segmented into a preferred image foreground region and a preferred image object region. A composite image is automatically composed by replacing the original image object region with the preferred image object region such that the composite image includes the original image foreground region and the preferred image object region. An attribute of the composite image is automatically adjusted.

17 Claims, 9 Drawing Sheets

AUTOMATIC OBJECT REPLACEMENT IN AN IMAGE

TECHNICAL FIELD

This description relates to an automatic object replacement scheme in an image.

BACKGROUND

In one example, photos taken outdoors often have the sky as their background. The sky is often seen in the background in daily photographs. The sky may appear in different colors, shapes, sizes and attributes, including blue, reddish, cloudy, and stormy. Designers or photographers may prefer a certain sky image and desire to use it to replace the sky in another image for image editing purposes. For example, the day of an outdoor photoshoot happens to have a cloudy sky, and the photographer desires to post-process the images taken during the photoshoot by replacing the cloudy sky with a sunny sky.

To edit a sky region, users typically are required to perform a large amount of work. Existing techniques to replace the cloudy sky with a sunny sky demand manual work and manipulation by the photographer. For example, using current techniques, the photographer first manually identifies the sky region and foreground region with labels or the use of brushes in a design application to manually mark the different regions. Once manually identified, the sky and foreground regions can be manually segmented from each other.

In some existing techniques, the manual identification and segmentation of the different regions may include manually assigning each pixel a sky or non-sky label. This manual segmenting process has to be done for both the image having the desired foreground region and the different image having the desired sky region. These and other segmentation problems may arise due to a number of factors including large variations in appearance, and complicated boundaries with other regions or objects such as, for example, trees, mountains, water, and the like. Thus, users who wish to edit sky regions, as well as other objects appearing in an image, are often faced with a large and daunting task.

After the manual segmenting process is completed by the user, then the desired sky region can be moved to the desired foreground region to form a composite image. Another limitation of the manually segmented and composed process is that the composite image output looks manipulated. In many cases, users need to further manually adjust the color of the foreground region and the sky region in the composite image to blend the two regions. For instance, the user may need to manually adjust the hue and/or saturation of the foreground and sky regions to blend the two regions.

The overall process to segment the sky regions from the various images, compose the desired foreground region with the desired sky region and perform color matching to make a composite image natural looking requires a huge amount of manual work for professionals. It may take many minutes to make a good composite image for experts who are familiar with all of the tools used during this manually intensive process. Amateurs may take even longer to complete the task, even with step-by-step guidance. This is not only true for replacing the sky in an image with another desired sky region, but is also true for objects in images other than the sky such as bodies of water, forestry, a city scape, etc. For instance, for an image with a body of water, the user may desire to replace the body of water in the image with another preferred body of water from a different image. The same challenges exist for manual replacement of the body of water in the image as exist for manual replacement of a sky in an image. Thus, it is desirable to improve the process of object replacement in images including sky replacement, body of water replacement and other object replacement.

SUMMARY

According to one general aspect, systems and techniques for automatic object replacement in an image include receiving an original image and a sky image. The original image is automatically segmented into an original image foreground region and an original image sky region. The sky image is automatically segmented into a sky image foreground region and a sky image sky region. A composite image is automatically composed by replacing the original image sky region with the sky image sky region such that the composite image includes the original image foreground region and the sky image sky region. An attribute (e.g., color) of the composite image is automatically adjusted.

Automatic sky replacement includes the automatic segmentation of the images, the automatic composition of the composite image and the automatic color adjustment of the composite image. Automatic means that these process techniques performed by the system are done without manual intervention or any manual user input. Automatic means that the system and techniques perform the process to replace the sky in one image with a sky region from another image for all of the process steps performed after the images are received until the final composite image is output and displayed.

In another general aspect, a system for automatic object replacement in an image includes at least one memory including instructions and at least one processor that is operably coupled to the at least one memory and that is arranged and configured to execute instructions that, when executed, cause the at least one processor to implement an application. The application includes a convolutional neural network (CNN) that is arranged and configured to receive an original image and a sky image.

The CNN segments the original image into an original image foreground region and an original image sky region by generating a probability map for the original image that identifies a probability for each pixel in the original image of whether the pixel is part of the original image foreground region or the original image sky region. The CNN segments the sky image into a sky image foreground region and a sky image sky region by generating a probability map for the sky image that identifies a probability for each pixel in the sky image of whether the pixel is part of the sky image foreground region or the sky image sky region.

The application includes a composition module that is arranged and configured to detect a maximum tight bounding box in the sky image sky region in which all pixels in the maximum tight bounding box are sky pixels. The composition module determines if the maximum tight bounding box covers the original image sky region. The composition module replaces the original image sky region with the maximum tight bounding box if the maximum tight bounding box covers the original image sky region to form a composite image. The composition module upscales the maximum tight bounding box to cover the original image sky region if the maximum tight bounding box does not cover the original image sky region and replaces the original image sky region with the upscaled maximum tight bounding box to form a composite image. The composite image includes the original image foreground region and the sky image sky region.

In another general aspect, a computer program product for automatic object replacement in an image is tangibly embodied on a non-transitory computer readable storage medium and includes instructions that, when executed by at least one computing device, are configured to cause the at least one computing device to receive an original image and a preferred image using a graphical user interface (GUI). The instructions cause the at least one computing device to automatically segment the original image into an original image foreground region and an original image object region. The instructions cause the at least one computing device to automatically segment the preferred image into a preferred image foreground region and a preferred image object region. The instructions cause the at least one computing device to automatically compose a composite image by replacing the original image object region with the preferred image object region such that the composite image includes the original image foreground region and the preferred image object region. The instructions cause the at least one computing device to automatically adjust an attribute (e.g., color) of the composite image and display the composite image on the GUI.

The details of one or more implementations are set forth in the accompanying drawings and the description below. Other features will be apparent from the description and drawings, and from the claims.

DETAILED DESCRIPTION

Figure 1:
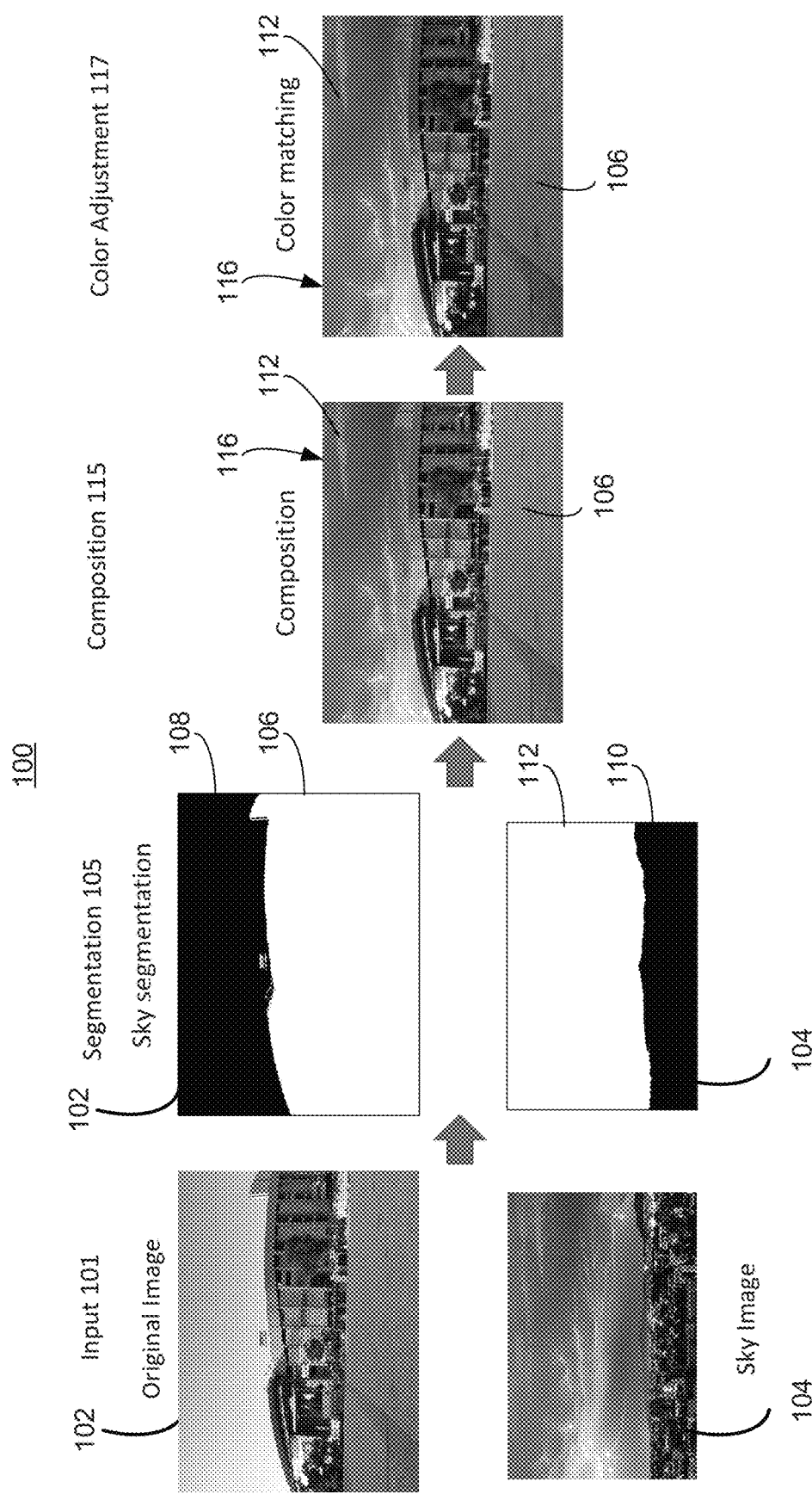
FIG. 1 is an example workflow process for automatic sky replacement in an image.

This document describes a system and techniques for automatic object replacement in an image. The system and techniques provide a technical solution to the technical challenges described above, namely how to replace the object region (e.g., sky region, water region, forest region, etc.) in an image with a different object region (e.g., sky region, water region, forest region, etc.) from a different image without having to manually segment the images, manually compose the images, and manually adjust the color in the images. The technical solution described in this document is a fully automatic, non-destructive object replacement process, which takes the original image and a preferred image as input and performs automatic segmentation, composition and attribute (e.g., color) matching.

The technical solution is achieved in the following manner. While this document describes a primary example of automatic sky replacement in an image, the techniques described herein are not limited to automatic sky replacement. The technical solution applies equally well to other automatic object replacement in images including, for example, bodies of water, forests, cityscapes, etc.

The automatic segmentation of the images into a sky region and a foreground region is achieved using a convolutional neural network (CNN). The CNN receives as input an original image and a sky image, where the original image includes the desired foreground region and an undesirable sky region and the sky image includes the desired sky region. In general, the CNN automatically segments the original image into an original image sky region and an original image foreground region. The CNN automatically segments the sky image into a sky image sky region and a sky image foreground region.

More specifically, the CNN performs the automatic segmentation by a generating a probability map that identifies a probability for each pixel in the original image and in the sky image of whether the pixel is part of the sky region or the foreground region. The probability map is used to segment the original image into the two separate regions and to segment the sky image into the two separate regions. Once automatically segmented by the CNN, the segmented regions may be used to automatically compose a desired composite image.

For other types of objects that are to be automatically replaced in an image, the CNN is trained using images containing the specific types of objects. For instance, the CNN may be trained to automatically segment a body of water from the foreground region or to automatically segment a forest from the foreground region in the same manner that the CNN segments the sky region and the foreground region in an image.

Following the segmentation of the images by the CNN, the technical solution automatically composes a composite image, where the composite image includes the original image foreground region and the sky image sky region. The automatic composition uses the probability map generated by the CNN. The automatic composition replaces the sky region in the original image with the sky region of the sky image. More specifically, a seamless replacement is accomplished by first detecting a maximum tight bounding box in the sky region of the sky image in which all the pixels are sky pixels. If necessary, upscaling is performed if the maximum tight bounding box does not cover the whole sky region of the original image. Then, the upscaled sky region of the sky image is used to replace the sky region of the original image. In this manner, the desired sky region is automatically scaled to fit the sky region of the original image without manual user intervention to output and display a composite image.

Once the composite image is automatically composed then automatic color adjustment is applied to the foreground region of the original image in the composite image so that it blends naturally with the new sky region. More specifically, the color statistics in the foreground regions of both the original image and the sky image are calculated, where the color statistics represent a color style (or simply style) of the image. Then, a transfer function is computed by using the two styles and the transfer function is then applied to the foreground region in the composite image. The transfer function affects just the color of the pixels in the foreground region to blend the foreground region in the composite images with the replaced sky in the composite image.

In some implementations, there may be a sky image in which there is no foreground region. That is, the entire sky image may be pure sky. In this situation, the color statistics are automatically calculated using the sky region of the sky image and the original image foreground region. A database of sky regions may be searched using the color statistics of the sky image sky region to find a matching sky region having a style matching that sky region. The transfer function may be generated using the color statistics of the original image foreground region and the color statistics of a foreground region of the matching sky region from the database of sky regions. The technical solution to automatically adjust the color of the foreground region in the composite image eliminates any need for manual intervention to make adjustments in order for the composite image to look natural and not to look manipulated.

In some implementations, the techniques used for the automated color matching of the foreground region to the new sky region may be used to automate the matching of other attributes and characteristics of the foreground region to the new sky region. For example, other styles including brightness, special effects, luminance, etc. may be automatically matched from the foreground region of the preferred image to the foreground region of the composite image so that the foreground region blends naturally with the new sky region.

The techniques described above as well as in more detail below to automatically replace the sky in an image with the sky from a different image may be implemented in a design application having a GUI. The GUI enables a user to replace a sky in one image simply by selecting the original image and selecting the image containing the desired sky. Following the selection by the user, the technical solution seamlessly and automatically replaces the sky from the original image with the sky from the image containing the desired sky.

Additionally, the technical solution performs the processes in a non-destructive manner meaning that the user is able to perform any additional manipulations of the composite image as may be desired. These additional manipulations are made possible because the technical solution generates three new layers as part of the sky replacement process. For instance, the solution creates an adjustment layer, an Earth layer and a sky layer. The adjustment layer adjusts the color to the layer below and it is clipped so that the effect is limited to the immediate layer below. The Earth layer is the foreground region of the original image with a layer mask to mask out the sky region so only the foreground region is visible. The sky layer, which is the desired sky region of the sky image, is scaled in position to replace the sky region of the original image. With each of these layers, the user may make additional adjustments that are in addition to the ones that are automatically made by the design application. As discussed in more detail below, each of the three new layers may be separately manipulated by the user in different ways.

The technical solutions described in this document are an improvement on the prior sky replacement techniques, which were labor-intensive that required users to manually identify the sky and foreground region, manually compose the image and manually adjust the color. Now, with the system and techniques described in this document, a fully automatic sky replacement method is provided where the user only needs to provide two input images, namely an original image and a preferred sky image. The system and techniques perform everything else automatically by segmenting the sky region in the foreground region using a CNN, scaling and positioning the preferred sky to compose with the foreground of the original image and analyze the statistics of the foreground and sky images to calculate the transfer function for color transferring. Then, the color transferring is applied to the foreground to achieve a realistic, naturally-looking blended composite image. This enables users of all skill to perform automatic sky replacement in an image with ease and speed compared to the manually and labor-intensive conventional techniques. The automated sky replacement process is also non-destructive meaning that after the automated process completes, the user can further manipulate the results in a further desired manner.

Furthermore, the technical solution overcomes not only technical challenges in the automation of each individual step in the process, but overcomes technical challenges and difficulties in the automation of the combination of the steps that comprise the overall process. The technical solution automates each step in the process as well as the overall process and achieves desired and superior results when compared to other techniques, including manual techniques and partially automated processes. More specifically, the solution enables a user to view a particular foreground region of an image with various different sky regions from other images in a user interface and does so while achieving great results that maintains the integrity of the original foreground region and that replaces the original sky region with the new sky region with precision and accuracy.

FIG. 1 is an example workflow 100 for automatic sky replacement. In general, the workflow 100 illustrates a process that takes as input two images, an original image 102 and a sky image 104 and replaces the sky region in the original image 102 with the sky region from the sky image 104. The workflow 100 preserves the foreground region of the original image 102, but uses a different sky region to match with the foreground region of the original image. The workflow 100 is one example illustration of the process using two images. The workflow 100 may be implemented by the system 300 illustrated and described in FIG. 3 below.

The workflow 100 includes four process steps: an input process 101, a segmentation process 105, a composition process 115 and a color adjustment process 117. The segmentation process 105, the composition process 115 and the color adjustment process 117 are all performed automatically and without user input following the user input of the original image 102 and the sky image 104.

Figure 6:
FIG. 6 is an example graphical user interface (GUI) for an application including an automatic sky replacement tool.

As part of the input process 101, two images are selected for use in the automatic sky replacement workflow 100. As mentioned above, the original image 102 includes the desired foreground region and the sky image 104 includes the desired sky region. The input 101 may be a manual selection by a user through a graphical user interface (GUI). An example GUI is illustrated in FIG. 6 below. In some implementations, the original image 102 is uploaded to an application or is browsed to from a stored location on a computing device for selection as part of the input process 101. Similarly, the sky image may be uploaded to the application or may be selected from a stored location on a computing device for selection as part of the input process 101. In some implementations, the sky image 104 may be selected from a database of sky images containing various images having different types of sky regions. In this manner, any one of the sky regions from the database of sky images may be used to replace the sky region in the original image 102.

Once the original image 102 and the sky image 104 have been input, the segmentation process 105 automatically segments each of the images 102 and 104 into a foreground region and a sky region. As discussed in more detail below, the segmentation process 105 may be performed automatically by a CNN. The segmentation process 105 segments the original image 102 into an original image foreground region 106 and an original image sky region 108. The segmentation process 105 segments the sky image 104 into a sky image foreground region 110 and a sky image sky region 112. The CNN may output a probability map identifying the sky region and the foreground region in each of the two images. The probability map is a pixel-by-pixel mapping of the image, where each pixel is determined to be either a foreground region pixel or a sky region pixel. In some implementations, the segmentation process 105 may be performed by any segmentation algorithm which can output a probability map that accurately and predictably determines which pixels in the images belong to the sky region and which pixels in the image belong to the foreground region.

In this example, the segmentation process 105 performed by the CNN generates a probability map for the original image 102 that identifies a probability for each pixel in the original image 102 of whether the pixel is part of the original image foreground region 106 or the original image sky region 108. The segmentation process 105 then segments each pixel in the original image 102 into the original image foreground region 106 and the original image sky region 108 using the probability map for the original image 102.

In this example, the segmentation process 105 performed by the CNN also generates a probability map for the sky image 104 that identifies a probability for each pixel in the sky image 104 of whether the pixel is part of the sky image foreground region 110 or the sky image sky region 112. The segmentation process 105 then segments each pixel in the sky image 104 into the sky image foreground region 110 and the sky image sky region 112 using the probability map for the sky image 104.

Following the segmentation process 105, the workflow 100 performs an automatic composition process 115. The composition process 115 is performed by replacing the original image sky region 108 with the sky image sky region 112 to arrive at a composite image 116. In this manner, the composite image 116 includes the original image foreground region 106 and the sky image sky region 112. As can be seen in the illustration of FIG. 1, the original image sky region 108 is no longer visible in the composite image 116. Instead, the original image sky region has been replaced with the sky image sky region 112 and only the sky image sky region 112 is visible in the composite image 116. Again, no manual intervention or user input is received as part of the composition process 115.

In some implementations, the size of the sky image sky region 112 may need to be adjusted when replacing the original image sky region in the composite image 116. An upscaling process may be used as part of the composition process 115, if necessary, for the sky image sky region 112 to cover the entire original image sky region 108 for use in the composite image 116. In general, a maximum tight bounding box in the sky image sky region 112 is detected in which all of the pixels are sky pixels using the probability map. Then, upscaling is done, if necessary, if the maximum tight bounding box does not cover the whole original image sky region 108.

In some implementations, the segmentation process and the composition process may be performed on an original image and a preferred image to replace an object region in the original image with an object region in the preferred image, where the object region is a region other than a sky region such as, for instance, a water region or a forest region. The automatic segmentation and the automatic composition would be performed in the same manner as the segmentation and composition for a sky region except that the CNN would be trained to specifically replace a different objection region, such as a water region or a forest region.

Figure 2:
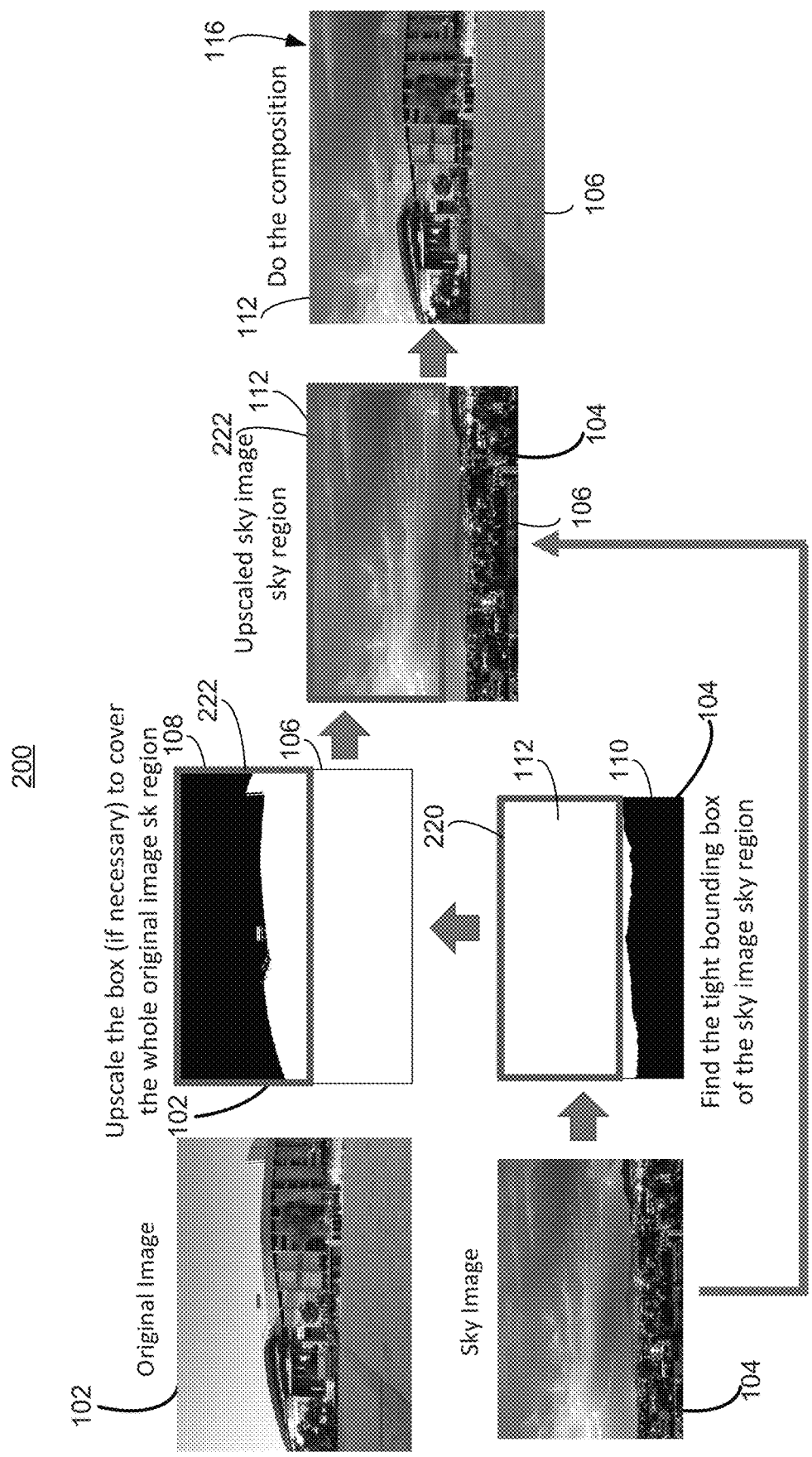
FIG. 2 is an example workflow process for upscaling a sky image sky region for use in the composition process of generating a composite image.

Referring also to FIG. 2, an example workflow 200 illustrates an upscaling process as part of the composition process 115. As discussed above, once the original image 102 and the sky image 104 have been segmented and probability maps have been generated, then a composition process is performed to replace the original image sky region 108 with the sky image sky region 112. To ensure a proper sizing and alignment, an upscaling process 200 may be used. First, a maximum tight bounding box 220 may be determined for the sky image sky region 112. The maximum tight bounding box 220 is the area of the sky image sky region 112 in which all of the pixels in the maximum tight bounding box 220 are sky pixels using the probability map. The bottom line of the maximum tight bounding box 220 is a line along which the entire row of sky pixels first touches a pixel from the sky image foreground region 110.

Once the maximum tight bounding box 220 is determined then a determination is made if the maximum tight bounding box covers the original image sky region 108. If the maximum tight bounding box covers the originals image sky region 108, then the original image sky region is replaced with the maximum tight bounding box 220. However, if the maximum tight bounding box does not cover the original image sky region 108, then the maximum tight bounding box 220 is upscaled to cover the original image sky region. As shown in FIG. 2, the upscaled bounding box 222 has been enlarged to cover the whole original image sky region 108. In this example, the sky image 104 is not as wide as the original image 102. Therefore, the sky image sky region 112 is not as wide as the original image sky region 108. Thus, the sky image sky region 112 is upscaled so that the entire original image sky region is covered with the upscaled sky image sky region 222.

Following the upscaling of the sky image sky region 222, the composite image 116 is generated. As discussed above, the composite image 116 includes the original image foreground region 106 and the sky image sky region 112, which in this case has been upscaled to fit the original image sky region area.

Referring back to FIG. 1, once the composition process 115 is complete to generate the composite image 116, then an automatic color adjustment process 117 is performed. Again, the color adjustment process 117 is performed automatically without manual input or user intervention. Color adjustment is applied to the composite image 116. Typically, the color adjustment is applied to the original image foreground region 106 of the composite image 116 in order to match the original image foreground region 106 with the sky image sky region 112. In this manner, the color adjustment process 117 enables the composite image 116 to blend naturally. Specifically, the original image foreground region 106 is color adjusted to blend more naturally with the sky image sky region 112.

In general, the color adjustment process 117 includes generating color statistics for the original image foreground region 106 and generating color statistics for the sky image foreground region 110. A transfer function is generated using these color statistics. The color of the composite image 116 is adjusted by applying the transfer function to the original image foreground region 106 of the composite image 116. In this manner, the transferred pixels in the original image foreground region 106 now blend naturally with the new sky from the sky image sky region 112 as can be seen in the example of FIG. 1.

In some implementations, there may be an outlier case where the sky image 104 does not include a foreground region. That is, the whole sky image is a pure sky. In this situation, the color adjustment process 117 includes generating color statistics for the sky image sky region 112 and the original image foreground region 106. A database of sky regions is searched using the color statistics of the sky image sky region 112 to find a matching sky region having a style matching the sky image sky region 112. Once a matching sky region from the sky region database is found then a transfer function is generated using the color statistics of the original image foreground region 106 and the color statistics of the foreground region of the matching sky region from the database of sky regions. Then, the color of the composite image 116 is adjusted by applying the transfer function to the original image foreground region 106 of the composite image. In this manner, the transfer pixels in the original image foreground region 106 now blend naturally with the new sky from the sky image sky region 112.

In some implementations, the techniques used for the automated color matching of the foreground region to the new sky region may be used to automate the matching of other attributes and characteristics of the foreground region to the new sky region.

Figure 3:
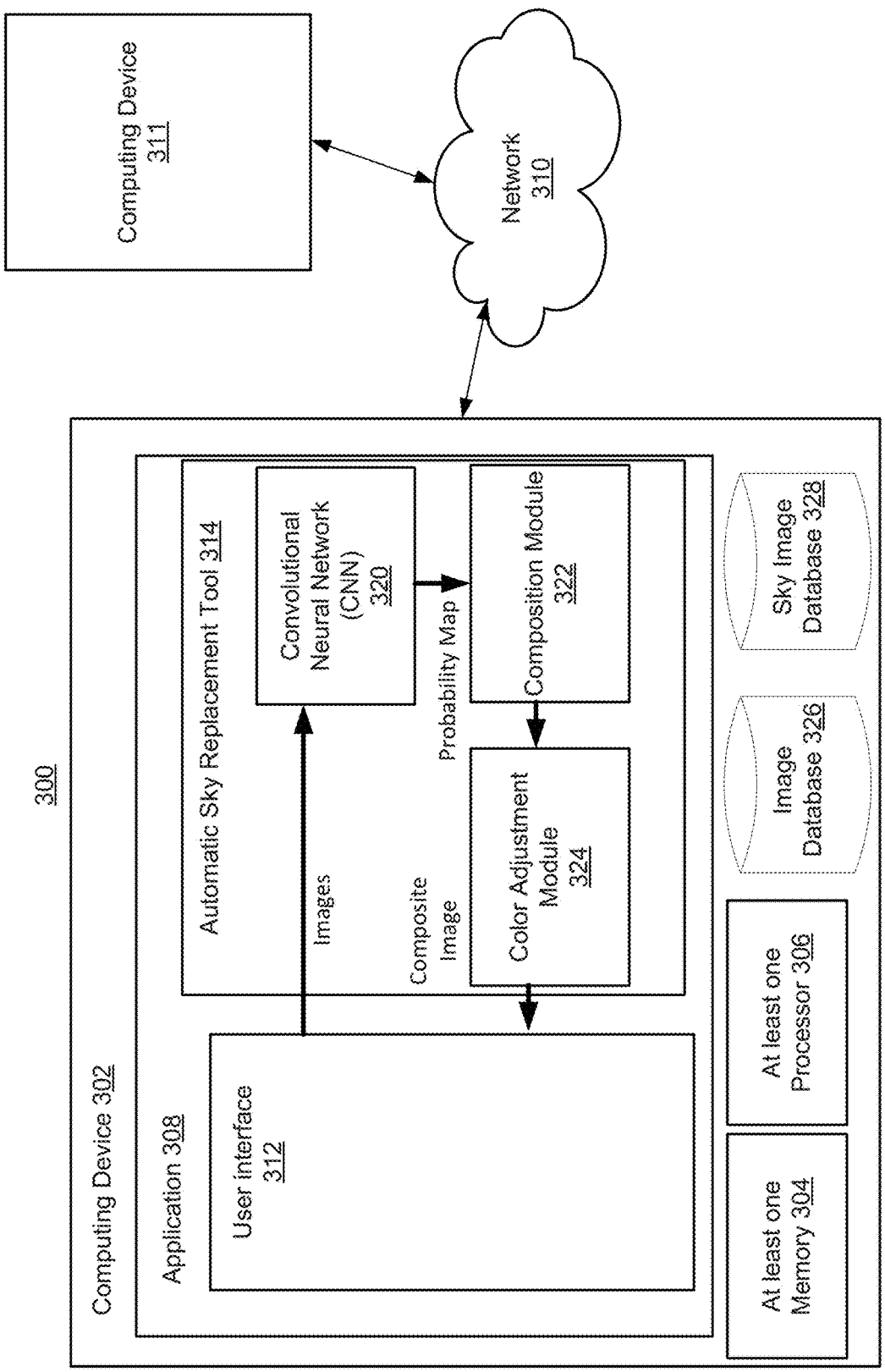
FIG. 3 is an example block diagram of a system for automatic sky replacement in an image.

FIG. 3 is a block diagram of a system 300 for automatic sky replacement in an image. The system 300 automatically replaces the sky region in one image with the sky region from another image to generate a composite image of an original foreground region with a different sky region, including automatically performing color adjustment on the composite image.

The system 300 includes a computing device 302 having at least one memory 304, at least one processor 306 and at least one application 308. The computing device 302 may communicate with one or more other computing devices over a network 310. For instance, the computing device 302 may communicate with a computing device 311 over the network 310. The computing device 302 may be implemented as a server, a desktop computer, a laptop computer, a mobile device such as a tablet device or mobile phone device, as well as other types of computing devices. Although a single computing device 302 is illustrated, the computing device 302 may be representative of multiple computing devices in communication with one another, such as multiple servers in communication with one another being utilized to perform its various functions over a network.

The at least one processor 306 may represent two or more processors on the computing device 302 executing in parallel and utilizing corresponding instructions stored using the at least one memory 304. The at least one processor 306 may include a graphics processing unit (GPU) and/or a central processing unit (CPU). The at least one memory 304 represents a non-transitory computer-readable storage medium. Of course, similarly, the at least one memory 304 may represent one or more different types of memory utilized by the computing device 302. In addition to storing instructions, which allow the at least one processor 306 to implement the application 308 and its various components, the at least one memory 304 may be used to store data, such as one or more of the images generated by the application 308 and its components used by the application 308.

The network 310 may be implemented as the Internet, but may assume other different configurations. For example, the network 310 may include a wide area network (WAN), a local area network (LAN), a wireless network, an intranet, combinations of these networks, and other networks. Of course, although the network 310 is illustrated as a single network, the network 310 may be implemented as including multiple different networks.

The application 308 may be accessed directly by a user of the computing device 302. In other implementations, the application 308 may be running on the computing device 302 as a component of a cloud network, where a user accesses the application 308 from another computing device over a network, such as the network 310. In one implementation, the application 308 may be a design application. The design application may include features that allow users to enhance, organize, and share images such as photographs, including image editing features. The design application may be a standalone application that runs on the computing device 302. Alternatively, the design application may be an application that runs in another application such as a browser application.

As discussed above, the application 308 may be a design application that includes many features and dozens of tools to edit images such as photographs (or photos). The application 308 includes a user interface 312, which includes an area to enable the user to manipulate and edit the images. One of the many tools of the application 308 includes an automatic sky replacement tool 314. The application 308 and the automatic sky replacement tool 314 may implement the workflow process 100 of FIG. 1 and the workflow process 200 of FIG. 2 for automatic sky replacement. The automatic sky replacement tool 314 takes as input and original image and a sky image, where the sky image includes a desired sky region to be matched with a foreground region of the original image.

The application 308 includes a user interface 312 also referred to interchangeably as a GUI 312. The automatic sky replacement tool 314 includes a convolutional neural network (CNN) 320, a composition module 322 and a color adjustment module 324. The user interface 312 is the front facing interface with the application 308 that enables the user to manipulate and edit images including using the automatic sky replacement tool 314. The automatic sky replacement tool 314 may be initiated from the user interface 312. The user interface 312 is the area of the application 308 where the user can select an original image such as original image 102 of FIG. 1 and a sky image, such as sky image 104 of FIG. 1 as part of the input to the automatic sky replacement tool 314.

The original image and the sky image may be input into the application 308 by various different manners. For example, the images may be directly uploaded from an image capture device such as a camera or a smart phone having a camera. The images also may be selected from a database of images such as image database 326 and/or sky image database 328. Still, in other examples, the images may be selected from a different computing device such as computing device 311 through the network 310. The original image includes the desired foreground region and a sky region that is desired to be replaced. The sky image includes the desired sky region to replace the sky region in the original image.

Once selected through the user interface 312, the original image and the sky image are received by the CNN 320. The original image and the sky image may be processed serially by the CNN 320. In some implementations, the original image and the sky image may be processed in parallel by the CNN 320. For instance, the automatic sky replacement tool 314 may include multiple CNN modules in order to process multiple images at the same or nearly the same time. The CNN 320 performs the segmentation process as described above with respect to the segmentation process 105 of FIG. 1. The CNN 320 takes as input an image and outputs a probability map, which indicates the probability for each pixel in the image as to whether the pixel is a sky region pixel or a non-sky region pixel.

The CNN 320 is one example of a neural network including a deep neural network. As additional background, in general, neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network.

Each neural network is trained for a specific task, e.g., image upscaling, prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

More specifically, regarding the CNN 320, the CNN 320 segments the original image into an original image foreground region and an original image sky region by generating a probability map for the original image that identifies a probability for each pixel in the original image of whether the pixel is part of the original image foreground region or the original image sky region. Similarly, the CNN 320 segments the sky image into a sky image foreground region and a sky image sky region by generating a probability map for the sky image that identifies a probability for each pixel in the sky image of whether the pixel is part of the sky image foreground region or the sky image sky region.

In some implementations, the probability map also may be referred to as a probability mask. The resulting probability map output by the CNN 320 identifies a range from 0 to 1 for each of the pixels in the image. A pixel with a value of 0 (zero) in the probability map means it is definitely not a sky pixel. A pixel with a value of 1 (one) definitely means that the pixel is a sky pixel. A pixel with the value of 0.7 means that the CNN 320 determined that there is a 70% chance that the pixel is part of the sky. The CNN 320 may include a classifier that uses the probability map and classifies each pixel is either sky for non-sky. A pixel may be classified as sky if it has greater than a 50% chance that the pixel is part of the sky is determined by the CNN 320. A pixel may be classified as non-sky if it has less than a 50% chance that the pixel is part is not part of the sky.

In some implementations, the CNN 320 may perform the segmentation using the system and techniques described in U.S. Pat. No. 9,858,675, which is hereby incorporated by reference in its entirety. For example, FIG. 5 and the corresponding text of U.S. Pat. No. 9,858,675 describes an example segmentation process that results in pixel-wise label assignments of each pixel in the image as either sky or non-sky. This technique and procedure may be implemented by the CNN 320, which also may incorporate the other systems and techniques as described therein. The resulting probability map or probability mask with the label assignments of each pixel as either sky or non-sky may be stored in the at least one memory 304.

In some implementations, the automatic sky replacement tool 314 may be more generically referred to as an automatic object replacement tool, where the object to be replaced in an image may be an object such as a body of water or a forest. In such implementations, the segmentation process and the composition process may be performed on an original image and a preferred image to replace an object region in the original image with an object region in the preferred image, where the object region is a region other than a sky region such as, for instance, a water region or a forest region. The automatic segmentation and the automatic composition would be performed in the same manner as the segmentation and composition for a sky region except that the CNN 320 would be trained to specifically replace a different objection region, such as a water region or a forest region.

The composition module 322 is configured to generate a composite image that includes the original image foreground region and the sky image sky region using the probability maps generated and output by the CNN 320. The composition module 322 is configured to perform the composition process 115 of FIG. 1, which also includes the upscaling process 200 of FIG. 2. In this manner, the composition module 322 is configured to detect a maximum tight bounding box in the sky image sky region in which all pixels in the maximum tight bounding box are sky pixels. In order to detect the maximum tight bounding box, the composition module 322 uses the probability map created by the CNN 320.

Once the maximum tight bounding box is detected then the composition module 322 determines if the maximum tight bounding box covers the original image sky region. If the maximum tight bounding box covers the original image sky region, then the composition module 322 replaces the original image sky region with the maximum tight bounding box to form a composite image. If the maximum tight bounding box does not cover the original image sky region, then the composition module 322 upscales the maximum tight bounding box to cover the original image sky region and replaces the original image sky region with the upscaled maximum tight bounding box to form the composite image. As discussed above, this process is discussed with respect to upscale process 200 of FIG. 2.

The composition module 322 may execute the below Pseudocode 1 in order to calculate the scaling and positioning of the sky from the sky image to the original image.

Pseudocode 1

Figure 4:
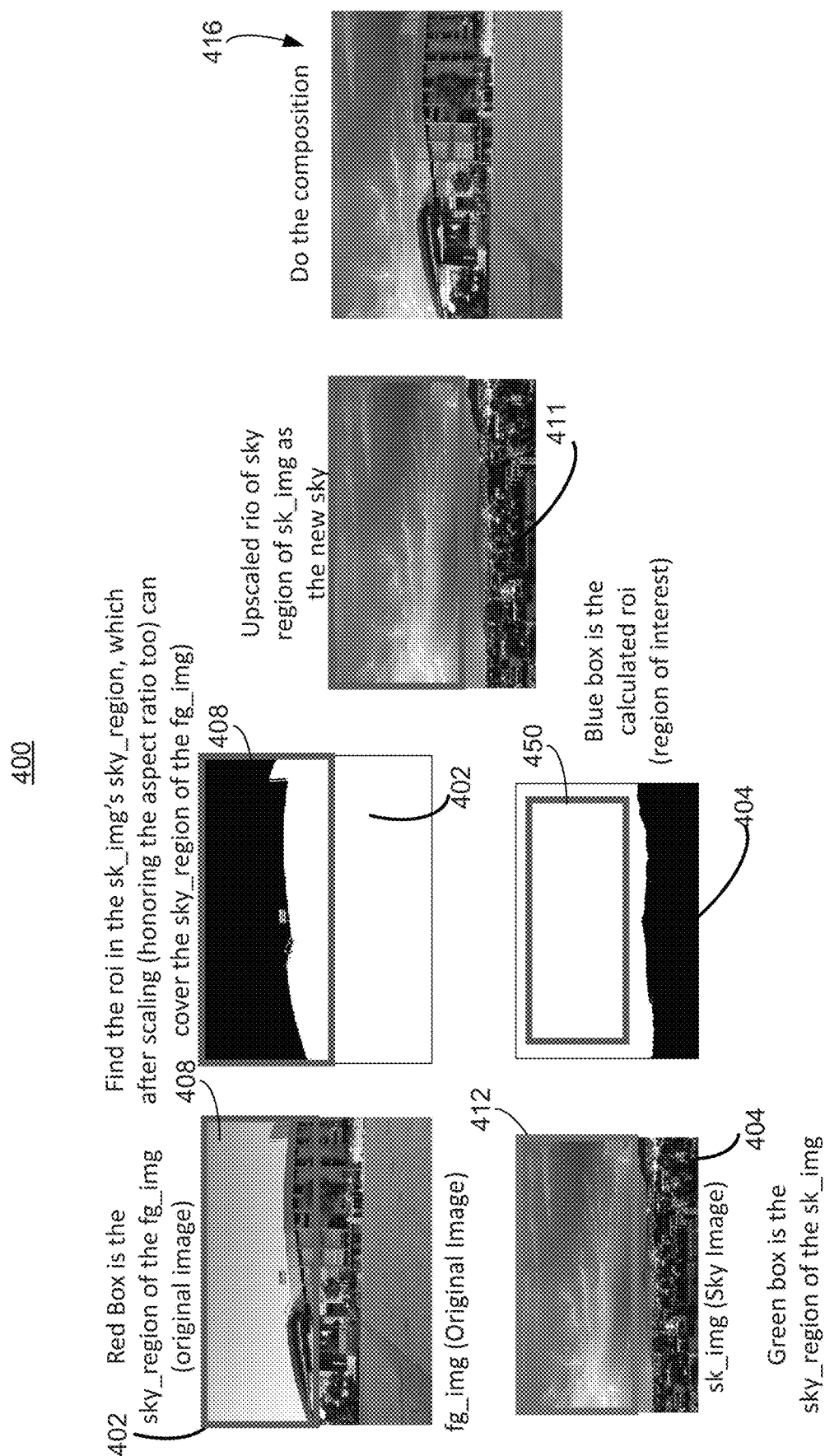
FIG. 4 is an example workflow process of Pseudocode 1 for upscaling a sky image sky region for use in the composition process of generating a composite image.

Referring also to FIG. 4, an example workflow process 400 illustrates an upscaling process according to Pseudocode 1, which may be executed by the composition module 322. The original image 402 is labeled as the FG_IMG in FIG. 4 and in the Pseudocode 1. The sky image 404 is labeled as the SK_IMG in FIG. 4 and in the Pseudocode 1. The Pseudocode 1 and the workflow process 400 illustrate how to calculate the scaling and positioning of the sky from the sky image 404 to the original image 402. The red box is the sky region 408 of the original image 402. The green box is the sky region 412 of the sky image 404.

The Pseudocode 1 steps through how to calculate the region of interest (roi) from the sky image sky region 404. The region of interest is the blue box 450. Once the region of interest in the sky image sky region is found, then the region of interest can be scaled to cover the sky region of the original image 402. Image 411 illustrates the upscaled region of interest of the sky region of the sky image as the new sky. Then, the composition module 322 can compose the composite image 416 to include the upscaled sky region of the sky image and the foreground region of the original image.

Referring back to FIG. 3, the composite image is output from the composition module 322 and input into the color adjustment module 324. The color adjustment module 324 is configured to automatically adjust one or more color settings of the composite image so that the foreground region blends naturally into the new sky region. The color adjustment module 324 may perform the color adjustment process 117 of FIG. 1. As discussed above, the color adjustment module 324 generates color statistics for the original image foreground region and the sky image foreground region. The color adjustment module 324 generates a transfer function using the color statistics. Then, the color adjustment module

```
fg_img.sky_region is the sky region in the fg_img (original image)
sk_img.sky_region is the sky region in the sk_img (sky image)
// Find the ratio of the picture, use rows (i.e., height) as the reference
float ratio_calibrate = float(sk_img.rows) / fg_img.rows;
// How big should the sky be in the sk_img,
// based on the ratio_calibrate and fg_img's sky_region
int calibrated_width = int(fg_img.sky_region.width*ratio_calibrate);
int calibrated_height = int(fg_img.sky_region.height*ratio_calibrate);
// The ratio of the calibrated_width and the actual sky_region's width in sk_img
// And height too
float ratio_w = float(calibrated_width) / sk_img.sky_region.width;
float ratio_h = float(calibrated_height) / sk_img.sky_region.height;
// Find the bigger of ratio_h and ratio_w
float ratio = ratio_h > ratio_w ? ratio_h : ratio_w;
// Say, if ratio_w>1, which means, calibrated_width is bigger than
// sk_img's sky_region's width, so we need to scale down calibrated_width
// to fit sky_region's width in sky_img
if (ratio>1)
{
    calibrated_width = int(floor(calibrated_width / ratio));
    calibrated_height = int(floor(calibrated_height / ratio));
}
// this is to calculate the roi (region of interest), to be in the center of
// of the sky_region in the sky_img
int offsetx = (sk_img.sky_region.width − calibrated_width) / 2;
int offsety = (sk_img.sky_region.height − calibrated_height) / 2;
int tlx = sk_img.sky_region.x;
int tly = sk_img.sky_region.y;
// Rect is in the format of (starting X, starting Y, rect's width, rect's height)
roi = Rect(offsetx + tlx, offsety + tly, calibrated_width, calibrated_height);
// We then scale the roi area of sk_img to be the size of sky_region in the fg_img
// and use it as the new sky
```

324 adjust the color of the composite image by applying the transfer function to the original image foreground region of the composite image.

In some implementations, the color adjustment module 324 may calculate the transfer function using the system and techniques described in U.S. Pat. No. 9,857,953, which is hereby incorporated by reference in its entirety. The color adjustment module 324 may calculate the style image based on a color style and tone style from the original image foreground region and the sky image foreground region. A chrominance transfer function can then be applied to transfer the color style to the original image foreground region of the composite image utilizing a covariance of an input image color of the input image to control modification of the input image. A luminance transfer function can also be applied to transfer the tone style to the original image foreground region. FIG. 4 and the corresponding text of U.S. Pat. No. 9,857,953 illustrate and describe a process for calculating the chrominance transfer function to transfer the color style from one image to another image and for calculating the luminance transfer function to transfer the tone style from one image to another image.

In some implementations, the color adjustment module 324 may adjust the color of the original image foreground region according to the systems and techniques described in U.S. Pat. No. 10,074,161, which is hereby incorporated by reference in its entirety. For example, he color adjustment module 324 may apply the techniques illustrated and described in FIG. 7 and the corresponding text of U.S. Pat. No. 10,074,161.

In some implementations, the color adjustment module 324 may be more generically referred to as an attribute adjustment module. In this manner, attributes other than color may be automatically adjusted by the module to better match the foreground region of the composite image to the newly added region (e.g., sky region, water region, forest region, etc.) using attributes other than or in addition to color. In this manner, the attribute adjustment module may perform as described above with respect to color, but may be programmed to perform an automatic adjustment on other image attributes in addition to color, such as, for instance, brightness, special effects (e.g., grainy or hazy effect), etc.

Figure 5:
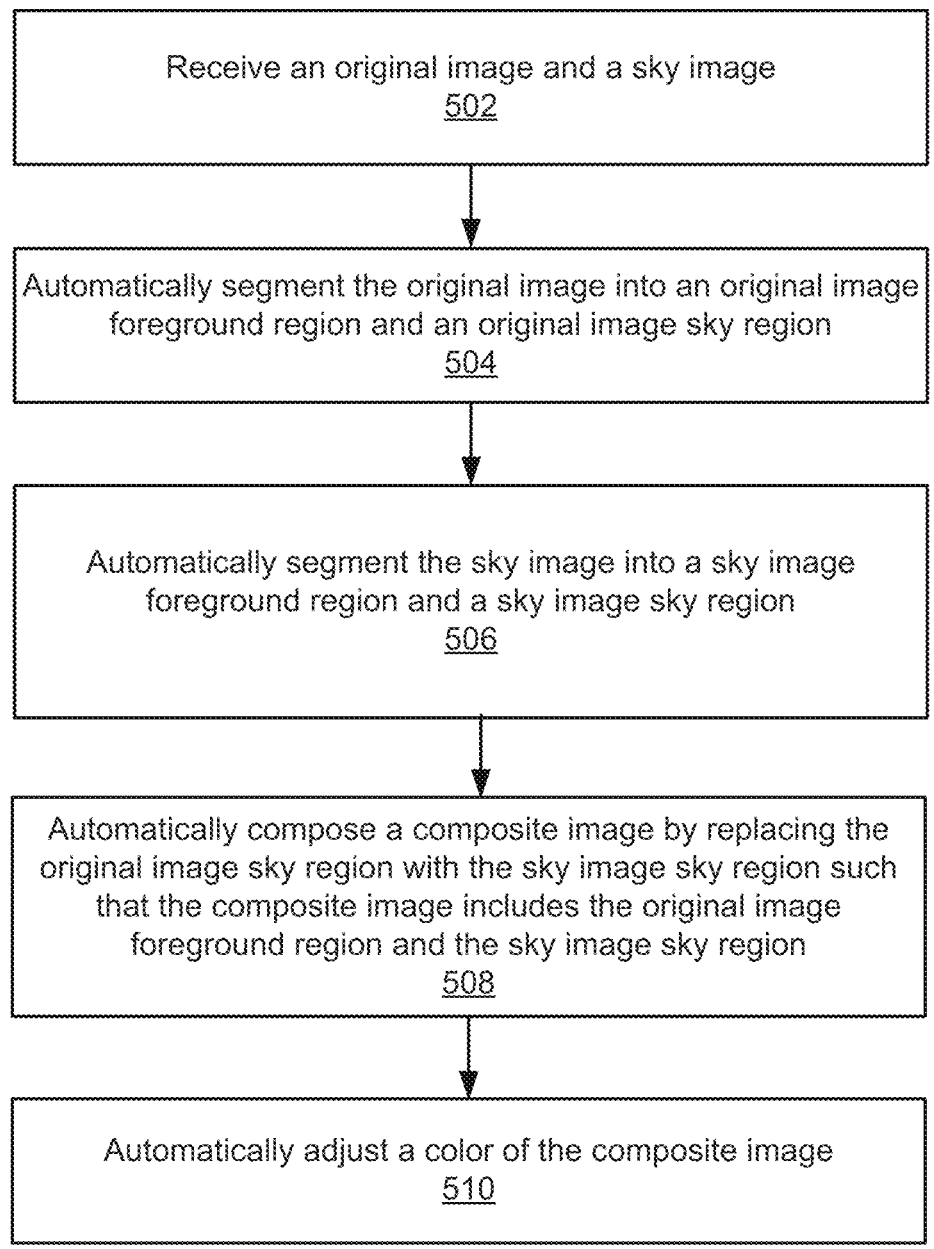
FIG. 5 is a flowchart illustrating example operations of the system of FIG. 3.

Referring to FIG. 5, an example process 500 illustrates example operations of the system 300 of FIG. 3. Process 500 is an example of a computer-implemented method for automatic sky replacement in an image. Instructions for the performance of process 500 may be stored in the at least one memory 304 and executed by the at least one processor 306 in the computing device 302.

Process 500 includes receiving an original image and a sky image (502). For example, with respect to FIG. 3, the automatic sky replacement tool 314, which is part of the application 308, may receive an original image and a sky image through the user interface 312. More specifically, the CNN 320 may receive the original image and the sky image. The CNN 320 may receive the original image and the sky image one at a time, that is in serial or in some implementations may receive the original image and the sky image in parallel for parallel processing by the CNN 320.

Process 500 includes automatically segmenting the original image into an original image foreground region and an original image sky region (504). Automatically segmenting means that once the original image and the sky image are received process 500 performs the automatic segmentation of the original image without further user input or any manual intervention. For example, the CNN 320 of FIG. 3 automatically segments the original image into an original image foreground region and an original image sky region. The automatic segmentation of the original image includes generating a probability map for the original image that identifies a probability for each pixel in the original image of whether the pixel is part of the original image foreground region or the original image sky region. Then, each pixel in the original image is segmented into the original image foreground region and the original image sky region using the probability map for the original image. As discussed above, the CNN 320 generates the probability map for the original image. In some implementations, other components that are capable of generating a probability map may perform process 504.

Process 500 includes automatically segmenting the sky image into a sky image foreground region and a sky image sky region (506). Automatically segmenting means that once the sky image is received, process 500 performs the automatic segmentation of the sky image without further user input or any manual user intervention. For example, the CNN 320 of FIG. 3 automatically segments the sky image into a sky image foreground region and a sky image sky region. The automatic segmentation of the sky image includes generating a probability map for the sky image that identifies a probability for each pixel in the sky image of whether the pixel is part of the sky image foreground region or the sky image sky region. Then, each pixel in the sky image is segmented into the sky image foreground region and the sky image sky region using the probability map for the sky image. As discussed above, the CNN 320 generates the probability map for the sky image. In some implementations, other components that are capable of generating a probability map may perform process step 506.

Process 500 includes automatically composing a composite image by replacing the original image sky region with the sky image sky region such that the composite image includes the original image foreground region and the sky image sky region (508). Automatically composing means that once the images have been automatically segmented then process 500 automatically generates the composite image without any manual user intervention or further user interaction. For example, the composition module 322 of FIG. 3 is configured to automatically compose the composite image by replacing the original image sky region with the sky image sky region such that the composite image includes the original image foreground region and the sky image sky region.

Automatically composing the composite image includes detecting a maximum tight bounding box in the sky image sky region in which all pixels in the maximum tight bounding box are sky pixels. Then, it is determined if the maximum tight bounding box covers the original image sky region. If the maximum tight bounding box covers the original image sky region, then the original image sky region is replaced with the maximum tight bounding box. If the maximum tight bounding box does not cover the original image sky region, then the maximum tight bounding box is upscaled to cover the original image sky region and the original image sky region is replaced with the upscaled maximum tight bounding box.

Process 500 includes automatically adjusting a color of the composite image (510). Automatically adjusting the color means that once the composite image has been automatically composed then process 500 automatically adjusts the color of the composite image without any manual user intervention or further user interaction. For example, the color adjustment module 324 of FIG. 3 is configured to automatically adjust the color of the composite image.

Automatically adjusting the color of the composite image includes automatically adjusting a color of the original image foreground region of the composite image. Automatically adjusting the color of the composite image includes generating color statistics for the original image foreground region and the sky image foreground region. A transfer function is generated using the color statistics. The color of the composite image is adjusted by applying the transfer function to the original image foreground region of the composite image.

In some implementations, the sky image may not include a foreground region. In this situation where the sky image is all sky, the color of the composite image may be automatically adjusted by generating color statistics for the sky image sky region and the original image foreground region. The color adjustment module 324 searches a database of sky regions, such as sky image database 328, using the color statistics of the sky image sky region to find a matching sky region having a style matching the sky image sky region. A transfer function is generated using the color statistics of the original image foreground region and the color statistics of a foreground region of the matching sky region from this database of sky regions, such as sky image database 328. Then, the color of the composite image is adjusted by applying the transfer function to the original image foreground region of the composite image.

Although not illustrated in FIG. 5, process 500 may include displaying the composite image on the user interface. For example, the application 308 displays the composite image on the user interface 312. Additionally, process 500 may include storing the original image foreground region as a first layer and the sky image sky region as a second layer, where the second layer is separate from the first layer and the second layer is user-movable relative to the first layer. The layers may be stored in the image database 326 and used by the application 308, including the user interface 312, for additional user manipulation once the composite image has been automatically generated. An example user interface is illustrated and discussed below with further discussion of the various image regions being stored as different layers for separate user manipulation.

Process 500 is an automatic sky replacement process that performs all of the steps without manual intervention or user interaction upon receipt of an original image and a sky image. In this manner, once a user selects an original image and a sky image, process 500 performs all of the steps and processes necessary to generate a composite image having the foreground region of the original image and the sky region of the sky image in the composite image. Process 500 is a non-destructive process meaning that once the process is complete and the automatic sky replacement has occurred with the resulting output of a new composite image, then the user may perform additional manipulations on the composite image as desired using one or more tools from the application 308.

As discussed above, the process 500 of FIG. 5 may be applied more generally to automatic object replacement, where an object region in a preferred image is used to replace an object region in an original image. In this manner, instead of the automatic replacement of the sky region in the original image, a different object such as a body of water or a forest, is automatically replaced in the original image by an object region from a preferred image using process 500.

Referring to FIG. 6, an example graphical user interface (GUI) 600 is illustrated. The GUI 600 is merely one example implementation of the user interface 312 in the application 308 for use with the automatic sky replacement tool 314 of FIG. 3. The GUI 600 includes a canvas 602. The canvas 602 enables the user to select an original image and a sky image for automatic sky replacement. The canvas 602 provides a display area for displaying a composite image.

The GUI 600 includes a thumbnail area 603. The thumbnail area 603 is configured to display multiple thumbnail images. The thumbnail images may be selected from the library 605, which enables access to the image database 326 and the sky image database 328. The selection of the library 605 may display images that have already been generated as composite images using the automatic sky replacement tool. In this example of FIG. 6, the thumbnails 606-614 displayed in the thumbnail area 603 illustrate several composite images having a same foreground region and different sky regions in each of the thumbnail images 606-614. A selection of one of the thumbnail images 606-614 enables the user to see the full-size composition in the canvas area 602. In this example, the thumbnail image 606 is selected and is displayed as full-size composite image 604 on the canvas 602.

The thumbnail images also may be selected using the import button 607. The user may select the import button 607 to import their own sky image to match with a foreground region that is imported from somewhere other than the image database 326 and the sky image database 328.

Figure 7:
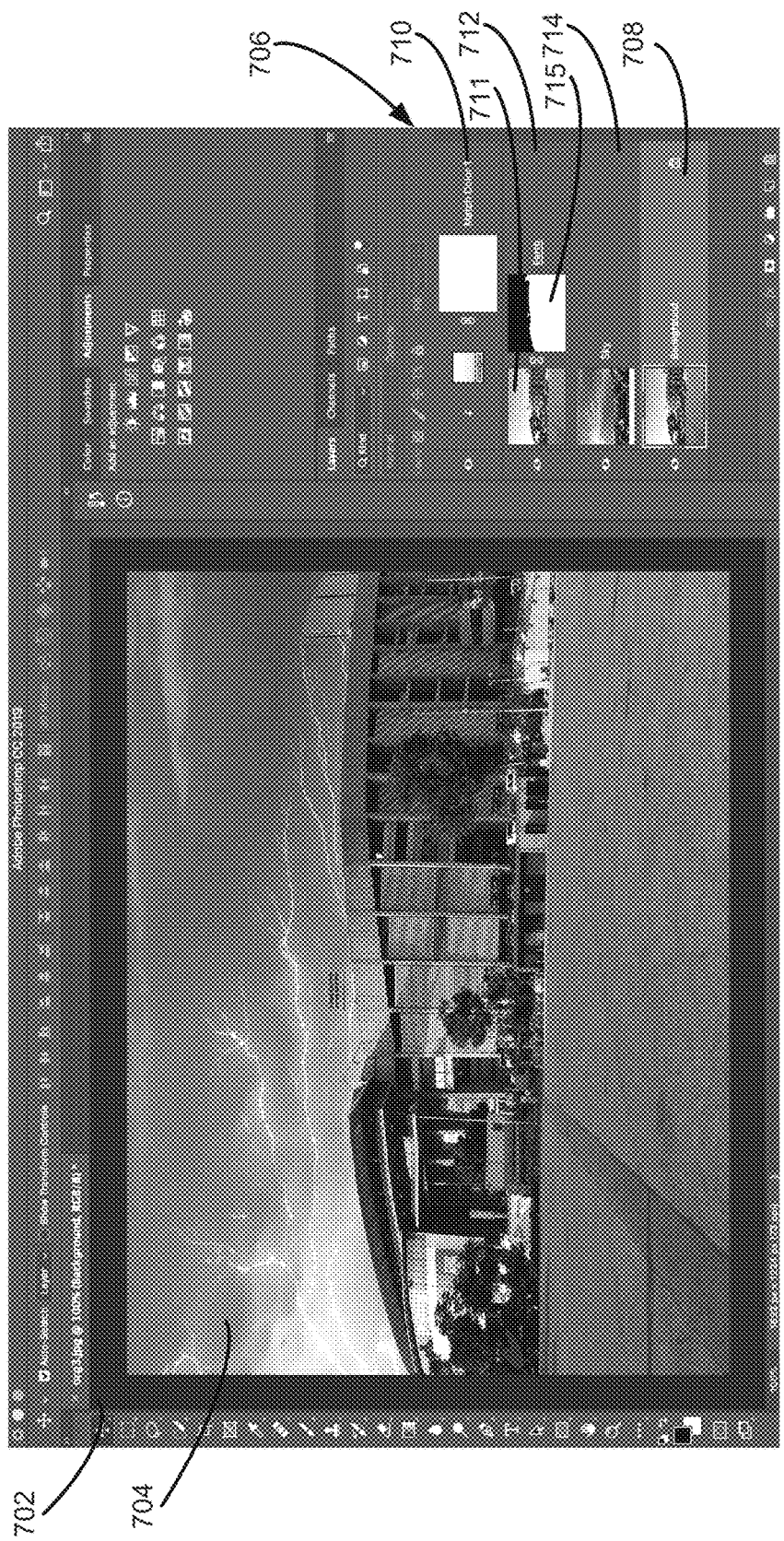
FIG. 7 is an example graphical user interface (GUI) of a design application including the automatic sky replacement tool and illustrating multiple layers.

Referring to FIG. 7, a GUI 700 is illustrated. The GUI 700 includes a canvas 702 on which a composite image 704 is displayed. The composite image 704 is an output of the automatic sky replacement tool 314 of FIG. 3. As part of the output of the sky replacement tool 314, multiple new layers are generated as non-destructive output. Each of these layers aid in the additional user manipulation of the composite image 704. The layers are displayed in a layer area 706. The layer area 706 displays the multiple different layers as well as the original image. In this example, the original image 708 is displayed and labeled as background. It is the foreground region of the original image 708 that is part of the composite image 704.

The layer area 706 includes an adjustment layer 710, an Earth layer 712, and a sky layer 714. The adjustment layer 710 is labeled "Match color 1". The adjustment layer 710 adjusts the color to the layer below and it is clipped so that the effect is limited to the immediate layer below. The adjustment layer 710, when selected, enables the user to further adjust the composite image 704 following the automatic sky replacement process. Adjustments may be made to the various color characteristics including, for example, hue, saturation, brightness, exposure, luminance, as well as other effects to adjust the image using one or more various tools from the application.

Figure 8A:
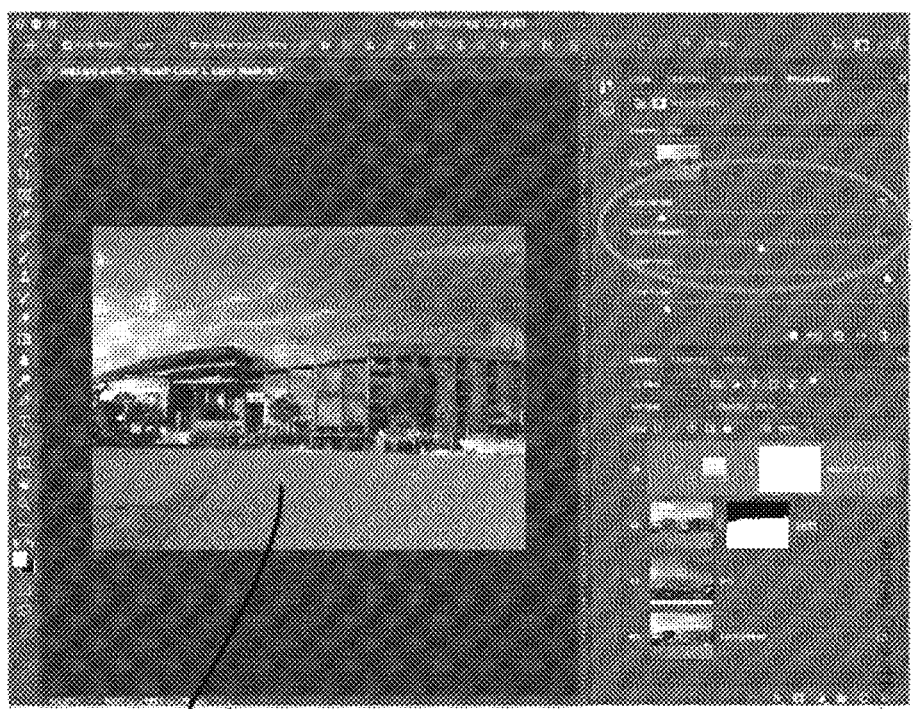
FIGS. 8A and 8B are example GUIs of the design application of FIG. 7 illustrating use of an adjustment layer.
Figure 8B:
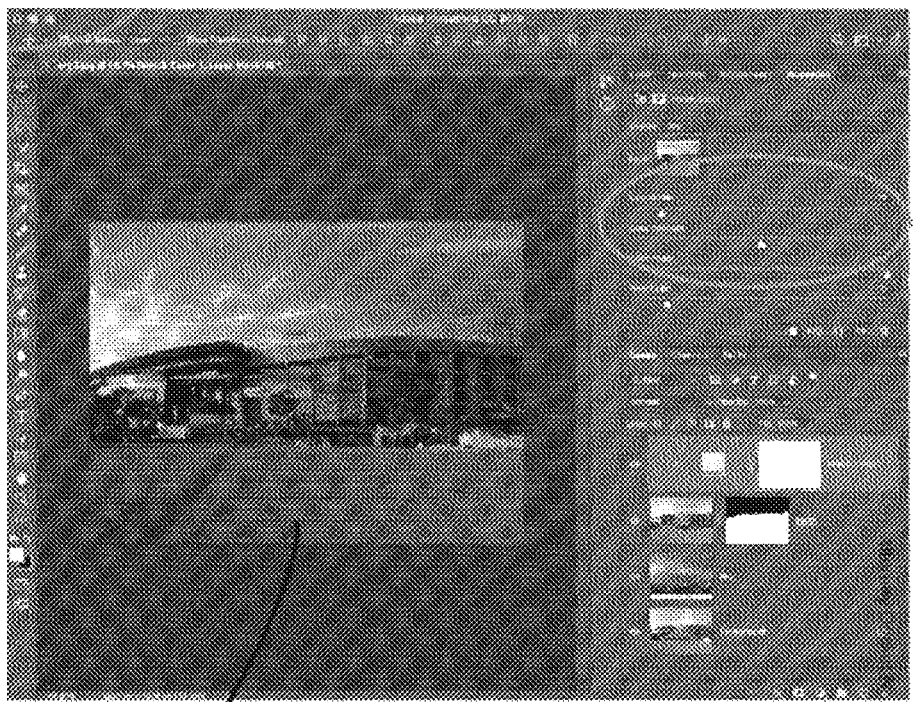

Referring also to FIGS. 8A and 8B, the composite image 704 is illustrated with the adjustment layer 710 selected. FIG. 8A illustrates the composite image 704 following the automatic sky replacement process. FIG. 8B illustrates the composite image 804 following a user adjustment made to the luminance characteristic by changing the luminance from the one setting to another setting, which changes the luminance of the foreground region of the composite image 804. Notice that the composite image 804 of FIG. 8B is darker than the composite image 704 of FIG. 8A.

Referring back to FIG. 7, the Earth layer 712 is the original image 713 with a layer mask 715 to mask out the sky region so only the foreground region is visible. When the Earth layer 712 is selected, the layer mask 715 may be further refined by the user using a refine mask tool. For example, the user may desire to make additional adjustments to the interface between the original image foreground region and the sky image sky region of the composite image 704 using the Earth layer 712 by refining the layer mask 715.

The sky layer 714 is the sky image sky region that is scaled and position to replace the original image sky region. Following the automatic sky replacement process, the user can make additional adjustments to the positioning of the sky image sky region using the sky layer 714 and a move tool. Selection of the sky layer 714 allows the user to re-position the sky region by using the move tool and dragging the sky around on the canvas 702. When the sky layer 714 is selected, the foreground region of the composite image remains fixed, while the sky region is movable using the move tool. In this manner, a first layer, such as the foreground region of the composite image remains fixed, and a second layer, such as the sky layer, is user-movable relative to the first layer. The second layer is separate from the first layer and the second layer is user-movable relative to the first layer.

Figure 9A:
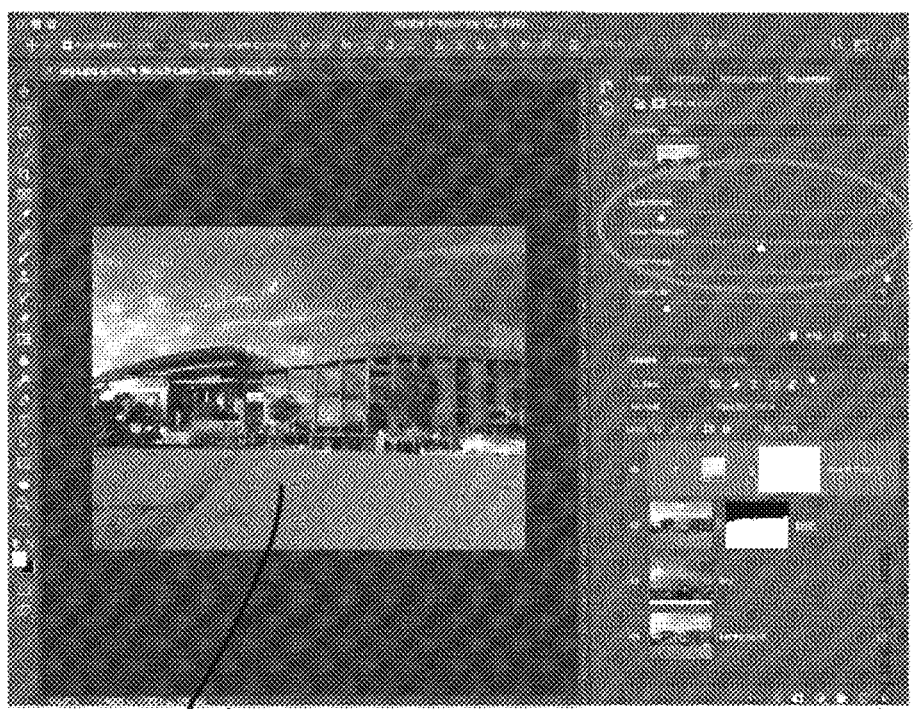
FIGS. 9A and 9B are example GUIs of the design application of FIG. 7 illustrating use of a sky layer.
Figure 9B:
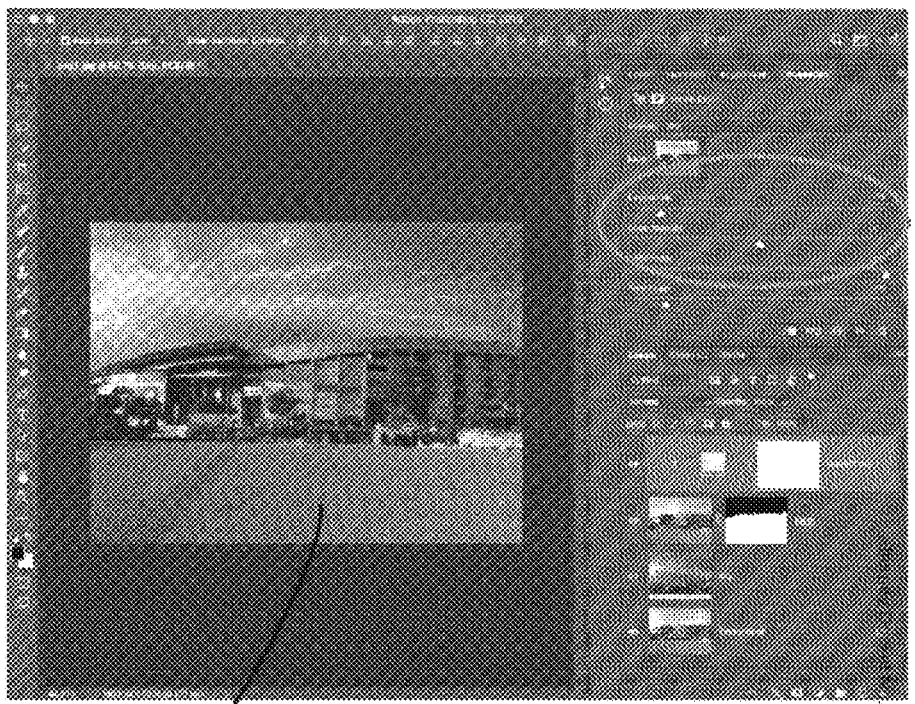

Referring also to FIGS. 9A and 9B, the GUI 900 of FIG. 9A illustrates the same composite image 704 as in FIG. 7. In FIG. 9B, the GUI 950 illustrates the composite image 904 where the sky layer has been selected and moved by the user using a move tool. As seen in FIG. 9B, the sky region has been repositioned so that the lightning streaks in the sky region are more prominent above the foreground region. In this manner, the use of the various layers enables the user to further manipulate the composite image following the automatic sky replacement process.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for automatic object replacement in an image, the method comprising:
receiving an original image and a sky image;
automatically segmenting the original image into an original image foreground region and an original image sky region;
automatically segmenting the sky image into a sky image foreground region and a sky image sky region;
storing the original image foreground region as a first layer and the sky image sky region as a second layer, wherein the second layer is separate from the first layer and the second layer is user-moveable relative to the first layer; and
automatically composing a composite image by replacing the original image sky region with the sky image sky region such that the composite image includes the original image foreground region and the sky image sky region.

2. The computer-implemented method as in claim 1, wherein:
automatically segmenting the original image comprises:
generating a probability map for the original image that identifies a probability for each pixel in the original image of whether the pixel is part of the original image foreground region or the original image sky region, and segmenting each pixel in the original image into the original image foreground region and the original image sky region using the probability map for the original image; and automatically segmenting the sky image comprises:
    generating a probability map for the sky image that identifies a probability for each pixel in the sky image of whether the pixel is part of the sky image foreground region or the sky image sky region, and
    segmenting each pixel in the sky image into the sky image foreground region and the sky image sky region using the probability map for the sky image.

3. The computer-implemented method as in claim 2, wherein:
    generating the probability map for the original image comprises generating the probability map for the original image using a convolutional neural network (CNN); and
    generating the probability map for the sky image comprises generating the probability map for the sky image using the CNN.

4. The computer-implemented method as in claim 1, wherein automatically composing the composite image comprises:
    detecting a maximum tight bounding box in the sky image sky region in which all pixels in the maximum tight bounding box are sky pixels;
    determining if the maximum tight bounding box covers the original image sky region;
    replacing the original image sky region with the maximum tight bounding box if the maximum tight bounding box covers the original image sky region; and
    upscaling the maximum tight bounding box to cover the original image sky region if the maximum tight bounding box does not cover the original image sky region and replacing the original image sky region with the upscaled maximum tight bounding box.

5. The computer-implemented method as in claim 1, wherein automatically adjusting the attribute of the composite image comprises automatically adjusting a color of the original image foreground region of the composite image.

6. The computer-implemented method as in claim 1, wherein automatically adjusting the attribute of the composite image comprises:
    generating color statistics for the original image foreground region and the sky image foreground region;
    generating a transfer function using the color statistics; and
    adjusting the color of the composite image by applying the transfer function to the original image foreground region of the composite image.

7. The computer-implemented method as in claim 1, wherein automatically adjusting the attribute of the composite image comprises:
    generating color statistics for the sky image sky region and the original image foreground region;
    searching a database of sky regions using the color statistics of the sky image sky region to find a matching sky region having a style matching the sky image sky region;
    generating a transfer function using the color statistics of the original image foreground region and color statistics of a foreground region of the matching sky region from the database of sky regions; and
    adjusting the color of the composite image by applying the transfer function to the original image foreground region of the composite image.

8. A system for automatic object replacement in an image, the system comprising:
    at least one memory including instructions; and
    at least one processor that is operably coupled to the at least one memory and that is arranged and configured to execute instructions that, when executed, cause the at least one processor to implement an application, the application comprising:
        a convolutional neural network (CNN) that is arranged and configured to:
            receive an original image and a sky image,
            segment the original image into an original image foreground region and an original image sky region by generating a probability map for the original image that identifies a probability for each pixel in the original image of whether the pixel is part of the original image foreground region or the original image sky region, and
            segment the sky image into a sky image foreground region and a sky image sky region by generating a probability map for the sky image that identifies a probability for each pixel in the sky image of whether the pixel is part of the sky image foreground region or the sky image sky region;
        a composition module that is arranged and configured to:
            detect a maximum tight bounding box in the sky image sky region in which all pixels in the maximum tight bounding box are sky pixels,
            determine if the maximum tight bounding box covers the original image sky region,
            replace the original image sky region with the maximum tight bounding box if the maximum tight bounding box covers the original image sky region to form a composite image, and
            upscale the maximum tight bounding box to cover the original image sky region if the maximum tight bounding box does not cover the original image sky region and replace the original image sky region with the upscaled maximum tight bounding box to form the composite image, wherein the composite image includes the original image foreground region and the sky image sky region; and
        a color adjustment module that is arranged and configured to adjust a color of the composite image, wherein the color adjustment module adjusts the color of the composite image by:
            generating color statistics for the sky image sky region and the original image foreground region;
            searching a database of sky regions using the color statistics of the sky image sky region to find a matching sky region having a style matching the sky image sky region;
            generating a transfer function using the color statistics of the original image foreground region and color statistics of a foreground region of the matching sky region from the database of sky regions; and
            adjusting the color of the composite image by applying the transfer function to the original image foreground region of the composite image.

9. The system of claim 8, wherein the color adjustment module adjusts the color of the composite image by adjusting a color of the original image foreground region of the composite image.

10. The system of claim 8, wherein the application stores the original image foreground region as a first layer in the at least one memory and stores the sky image sky region as a second layer in the at least one memory, wherein the second layer is separate from the first layer.

11. The system of claim 10, wherein the application further comprises a graphical user interface (GUI), wherein the GUI includes:
   a canvas that is configured to display the first layer and the second layer as the composite image, wherein the second layer is user-moveable relative to the first layer.

12. The system of claim 11, wherein the GUI further includes a layer area that is configured to display the first layer with a layer mask to mask out the original image sky region such that only the original image foreground region is displayed.

13. A computer program product for automatic object replacement in an image, the computer program product being tangibly embodied on a non-transitory computer-readable storage medium and comprising instructions that, when executed by at least one computing device, are configured to cause the at least one computing device to:
   receive an original image and a preferred image using a graphical user interface (GUI);
   automatically segment the original image into an original image foreground region and an original image object region;
   automatically segment the preferred image into a preferred image foreground region and a preferred image object region;
   automatically compose a composite image by replacing the original image object region with the preferred image object region such that the composite image includes the original image foreground region and the preferred image object region;
   store the original image foreground region as a first layer;
   store the preferred image object region as a second layer;
   automatically adjust an attribute of the first layer or the second layer using an adjustment layer; and
   display the composite image on the GUI.

14. The computer program product of claim 13, wherein:
   the instructions that, when executed, cause the at least one computing device to automatically segment the original image comprise instructions that, when executed, cause the at least one computing device to:
      generate a probability map for the original image that identifies a probability for each pixel in the original image of whether the pixel is part of the original image foreground region or the original image object region, and
      segment each pixel in the original image into the original image foreground region and the original image object region using the probability map for the original image; and
   the instructions that, when executed, cause the at least one computing device to automatically segment the preferred image comprise instructions that, when executed, cause the at least one computing device to:
      generate a probability map for the preferred image that identifies a probability for each pixel in the preferred image of whether the pixel is part of the preferred image foreground region or the preferred image object region, and
      segment each pixel in the preferred image into the preferred image foreground region and the preferred image object region using the probability map for the preferred image.

15. The computer program product of claim 13, wherein the instructions that, when executed, cause the at least one computing device to automatically compose the composite image comprise instructions that, when executed, cause the at least one computing device to:
   detect a maximum tight bounding box in the preferred image object region in which all pixels in the maximum tight bounding box are object pixels;
   determine if the maximum tight bounding box covers the original image object region;
   replace the original image object region with the maximum tight bounding box if the maximum tight bounding box covers the original image object region; and
   upscale the maximum tight bounding box to cover the original image object region if the maximum tight bounding box does not cover the original image object region and replacing the original image object region with the upscaled maximum tight bounding box.

16. The computer program product of claim 13, wherein the first layer and the second layer are stored in the at least one memory, wherein the second layer is separate from the first layer, wherein the GUI includes a canvas that is configured to display the first layer and the second layer as the composite image, and wherein the second layer is user-moveable relative to the first layer.

17. The computer program product of claim 13, wherein the adjustment layer adjusts the attribute of an underlying layer and is clipped for the attribute adjustment to be limited to the underlying layer, wherein the underlying layer comprises the first layer or the second layer.

\* \* \* \* \*